United States Patent [19]

Lee et al.

[11] Patent Number: 5,442,364

[45] Date of Patent: Aug. 15, 1995

[54] ALIGNMENT AND BEAM SPREADING FOR GROUND RADIAL AIRBORNE RADAR

[75] Inventors: Henry E. Lee, Ellicott City; Martin J. Decker, Baltimore; Stephen Warejko, Pasadena, all of Md.

[73] Assignee: The United States of America as represented by the Secretary of the Navy, Washington, D.C.

[21] Appl. No.: 94,957

[22] Filed: Jul. 22, 1993

[51] Int. Cl.$^6$ .................. H01Q 3/22; G01S 13/00
[52] U.S. Cl. .................. 342/372; 342/371; 342/25
[58] Field of Search ............ 342/372, 371, 157, 158, 342/140, 154, 25, 75, 76, 77, 81, 80, 191

[56] References Cited

U.S. PATENT DOCUMENTS

| | | | |
|---|---|---|---|
| 4,084,158 | 4/1978 | Slawsby | 342/25 |
| 4,291,308 | 9/1981 | Provine | 342/185 |
| 4,546,355 | 10/1985 | Boles | 342/175 |
| 4,611,208 | 9/1986 | Kanes et al. | 342/25 |
| 4,837,577 | 6/1989 | Peregrim et al. | 342/80 |

Primary Examiner—Thomas H. Tarcza
Assistant Examiner—Dao L. Phan
Attorney, Agent, or Firm—Paul I. Kravetz; Harry E. Barlow; John L. Forrest, Jr.

[57] ABSTRACT

A method and apparatus for controlling a radar beam emitted by a radar system. The invention produces improved high resolution ground mapping by aligning the antenna isogain or isonull lines with the ground radial lines. The antenna axis is rolled by an angle determined from the geometric principles of the unit vectors along the ground radial lines. A new azimuth pointing angle is then computed and implemented. A new azimuth beamshape, azimuth beamwidth and azimuth beam spoiling factor are also computed and implemented.

30 Claims, 5 Drawing Sheets

ALIGNMENT AND BEAM SPREADING FOR GROUND RADIAL AIRBORNE RADAR

BACKGROUND OF THE INVENTION

1. Field of the Invention

The present invention relates to ground mapping radar systems and more particularly to high resolution ground mapping radar systems utilizing electronically scanned antennas.

2. Description of the Related Art

Radar systems employing electronically scanned phased array antennas can be used on aircraft to map ground planes. As an aircraft flies over a ground plane, radar signals are emitted and reflected back to the aircraft. The radar system interprets these emitted and reflected signals and produces a map of the ground plane. The ground plane map is typically generated along ground radial lines to facilitate scan conversion to a TV display format. For coherent doppler beam sharpening (DBS) and synthetic aperture radar (SAR) maps, mapping along ground radial lines of a ground plane is accomplished by applying range-dependent phase reference functions which follow the ground radial lines.

Unfortunately, map resolution or map range coverage can be poor with ground mapping radar systems utilizing an electronically scanned phased array antenna. A particular problem arises when electronically scanned phased array radar systems are used on dynamic aircraft such as modern military bombers and fighters. These types of aircraft have the ability to perform at large roll angles, however, map illumination is especially poor at such angles. To provide acceptable map illumination, an aircraft typically must limit aircraft motion during the time when radar mapping is performed. Aircraft must essentially be non-maneuvering when mapping. With newer aircraft and various mapping scenarios, ground mapping during high dynamics is very important. Even with a level-flying aircraft, map illumination may be unacceptable for certain applications.

The above problems are caused by a deficiency of prior art radar systems which does not appear to be recognized in the art. The deficiency is that isogain lines of an electronically scanned phased array antenna will not in general be in alignment with ground radial lines. Here, an isogain line is defined as the ground footprint of the peaks of an antenna's azimuth patterns at each range line. An isogain line could deviate significantly from ground radial lines, especially at large aircraft roll. Large angular deviation produces rapid antenna gain falloff as a function of map range. This reduces high resolution map range coverage. When map range coverage along a ground radial line falls below the desired extent, a technique to spread the beam wider in azimuth can be used, however, this lowers antenna gain and degrades signal-to-noise performance of the resultant map. Larger azimuth beam spoiling (i.e., widening the beam) will also aggravate the doppler ambiguity problem associated with the proper selection of Pulse Repetition Frequency (PRF). This doppler ambiguity problem is routinely encountered in high resolution radar mapping.

Similar deficiencies not previously recognized in the prior art exist for radar systems employing noncoherent high-resolution map modes such as monopulse ground mapping (MGM). In this mode, the concern is angular deviation between the isonull line, i.e., the ground footprint of the antenna monopulse null, and ground radial lines. Large angular deviation increases the size of the data stabilization memory. Under extremely large aircraft roll motion, the angular deviation may become so large as to prevent mapping completely at near ranges.

SUMMARY OF THE INVENTION

The present invention solves these and many other related deficiencies or problems in prior art radar systems by providing a high-resolution ground mapping radar system employing an electronically scanned antenna which results in improved range coverage especially at large aircraft roll angles.

A primary objective of the present invention is to provide an apparatus and method for providing maximum antenna gain illumination along ground radial lines over the desired map range extent by adjusting or "rolling" the antenna axis dynamically as a function of aircraft maneuver and mapping geometry.

Another object of the present invention is to provide an apparatus and method for controlling the antenna azimuth pointing angle to compensate for the new rolled axis coordinates.

A further object of the present invention is to provide an apparatus and method for determining the antenna azimuth beamshape and azimuth spoiling factor for effective mapping along ground radial lines with a rolled antenna axis.

The invention relates to an apparatus and a method for controlling an antenna of a radar system where the antenna produces a radar beam which intersects a ground plane to form an isogain line or an isonull line on the ground plane. The ground plane has a plurality of ground radial lines radiating from an origin point on the ground plane, where the origin point is related to the navigational position of the radar system with respect to the ground plane. The isogain line or isonull line corresponds to a particular ground radial line. The invention relates to a method and apparatus for steering the radar beam to closely align the isogain line or isonull line with the corresponding ground radial line.

The invention also represents a technique for controlling elevation spread beams such as the fan or the cosecant-squared beam. With some modifications, this invention can be applied to other air-to-ground radar modes such as beacon, weather, and ground moving target indication (GMTI) mode. The invention is equally applicable to radar mapping with or without aircraft roll motion.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
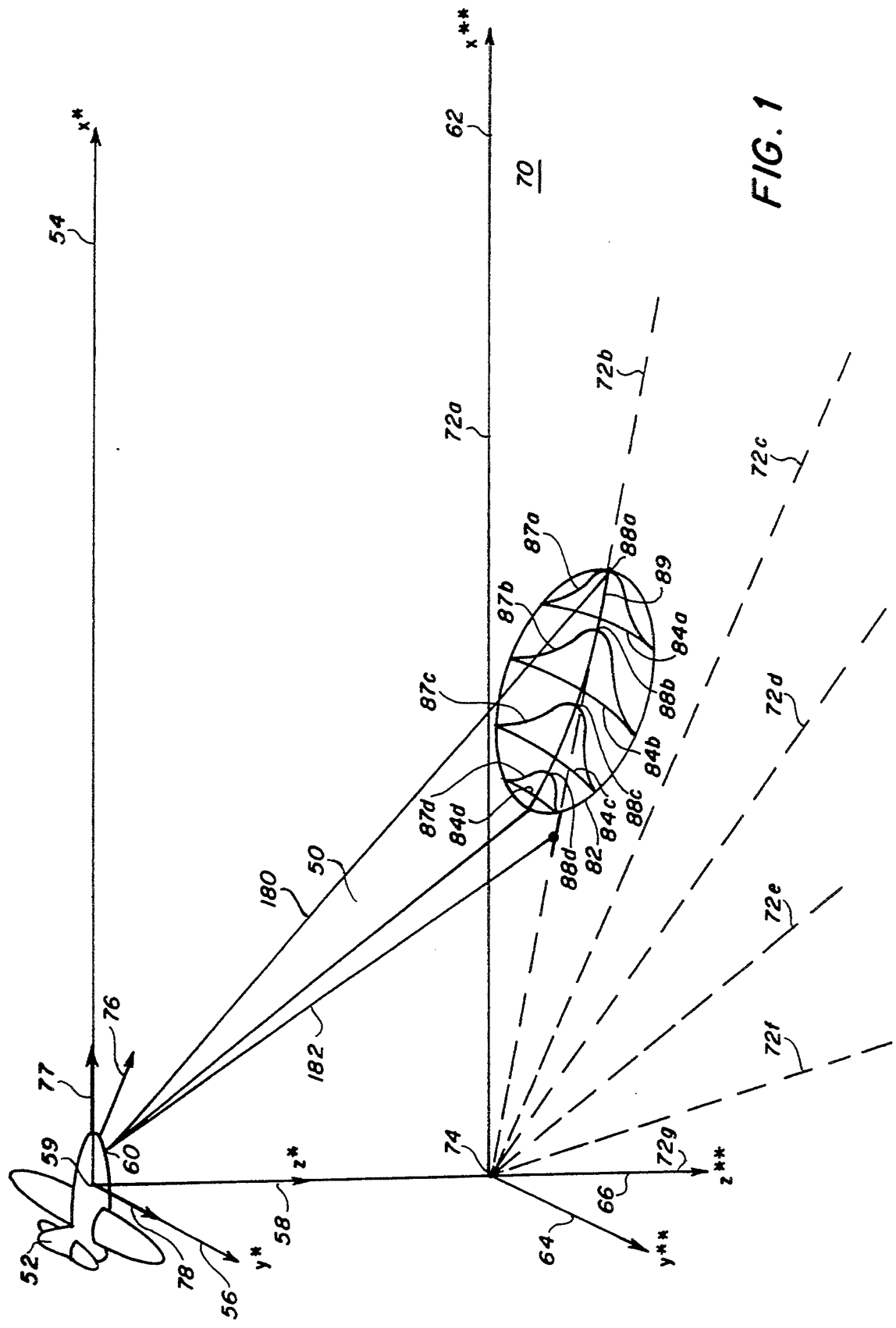
FIG. 1 is a diagram of a radar beam transmission from an airborne radar system.

Referring now to the drawings, wherein like reference numerals designate identical or corresponding parts throughout the several views, and more particularly to FIG. 1, thereof, a radar beam 50 is shown as being transmitted from an aircraft 52. The X*, axis 54 represents the horizontal plane heading axis of the aircraft. The Z*, axis 58 is vertical with positive direction downward. The Y*, axis 56 is perpendicular to the X*, axis 54 and the Z*, axis 58 and is nominally positive when clockwise from the X*, axis 54. The intersection 59 of the X*, axis 54, Y*, axis 56 and Z*, axis 58 represents the origin of the X*, Y*, Z*, axes system. The X*, axis 54, Y*, axis 56 and Z*, axis 58 are collectively referred to as the "aircraft axes." The point 60 on the aircraft 52 where the radar beam 50 originates represents the origin of the antenna axes (not illustrated). The origin 60 of the antenna axes is in a fixed physical position relative to the aircraft axes 54, 56, 58.

The X axis 62 and Y axis 64 represent the X*, axis 54 and Y*, axis 56, respectively, projected on the ground plane 70. The Z** axis 66 and Z*, axis 58 are coaxial. The X axis 62, Y axis 64 and Z axis 66 collectively are referred to as the "ground plane axes." Lines (hereinafter referred to as 72 when referenced collectively, and referred to as either 72a, 72b, 72c, 72d, 72e, 72f and 72g when referenced individually) represent ground radial lines. The intersection 74 of the ground radial lines 72 represents the origin of the ground plane axes 62, 64, 66. A rotation about the Z axis 66 to align the ground plane axes 62, 64, 66 with any local level coordinate frame can be easily made. For the graphical description in FIG. 1, a simple 0 degree heading reference is used.

The antenna center (not illustrated) is located at the origin 60 of the antenna axes in a fixed position on the aircraft. When designing a particular type of radar, the antenna center location is fixed in a position which is most effective for the type of radar application.

The aircraft's velocity vector 76 is also represented. The velocity vector 76 is broken down into a component 77 which is coaxial to the X*, axis 54, hereinafter called the "longitudinal aircraft velocity vector", and a component 78 which is coaxial to the Y*, axis 56, hereinafter called the "cross aircraft velocity vector".

$\phi_d$ (not illustrated) represents the map angle, i.e., the angle between a ground plane projection (not illustrated) of the longitudinal aircraft velocity vector 77 and the ground radial lined 72 being mapped. Ground radial lines 72 are referenced in FIG. 1 by their map angles. For example, when the 30° ground radial line 72c is referred to, this reference is to a ground radial line which is at a 30° angle from the X** axis 62. In FIG. 1, it can be assumed that $\phi_d$ is 15° since the figure shows the 15° ground radial line 72b being mapped.

The radar beam 50 can be described as conical shaped. The circular or elliptical intersection 82 of the radar beam 50 with a ground plane 70 represents the 3 dB contour. Range lines 84a, 84b, 84c, 84d indicate radar sampling performed at different times, since radar range is a function of time. Each of the range lines 84a, 84b, 84c, 84d has an associated azimuth pattern 87a, 87b, 87c, 87d and each azimuth pattern 87a, 87b, 87c, 87d has a maximum illumination value 88a, 88b, 88c, 88d. If a line 89 is drawn which connects the maximum illumination values 88a, 88b, 88c, 88d of the individual azimuth patterns 87a, 87b, 87c, 87d for each range line 84a, 84b, 84c, 84d, the resulting line 89 represents an isogain line.

FIG. 1 is also helpful in understanding monopulse ground mapping (MGM) mode of radar operation. MGM, commonly known in the art, uses monopulse processing to provide azimuth resolution improvement. With MGM operation, an isonull line is the ground footprint of the monopulse null at different ranges. If Figure were used to explain MGM operation, the isogain line 89 would instead be labeled an "isonull" line.

Figure 2:
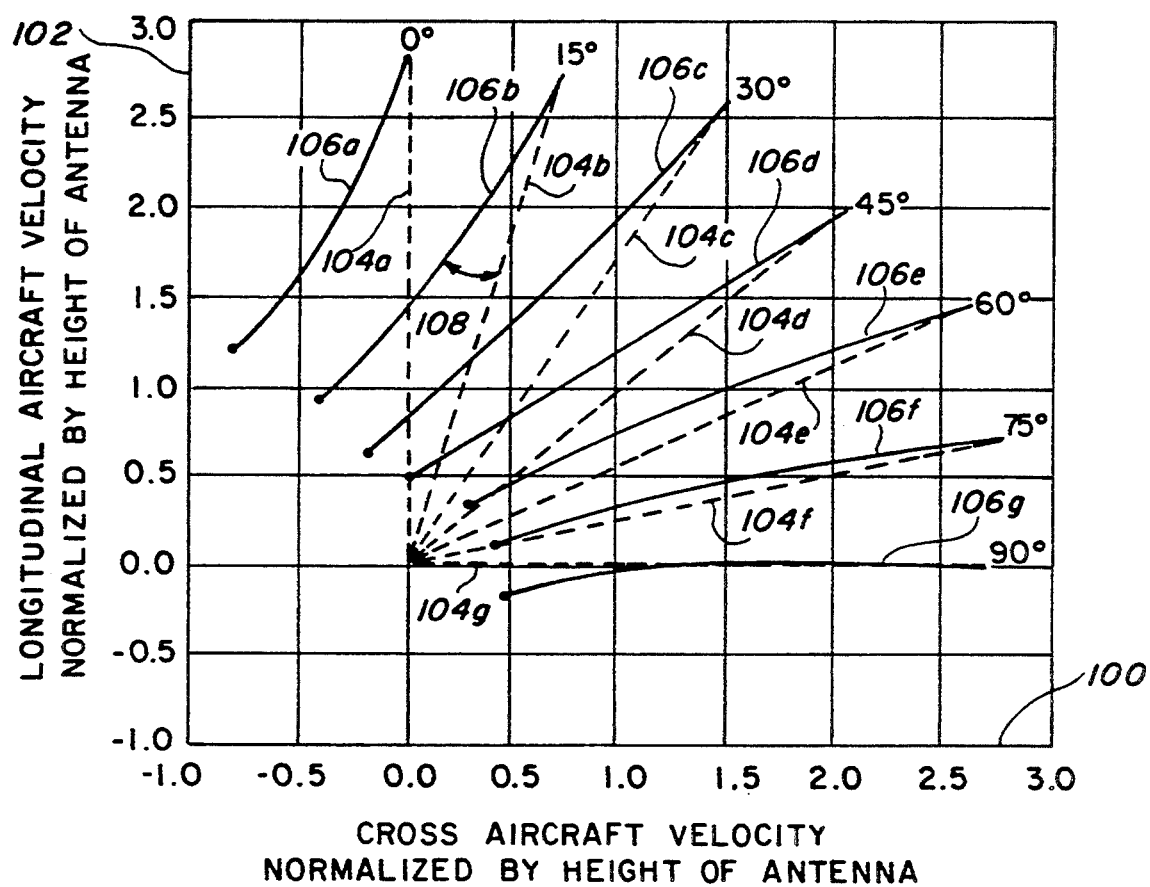
FIG. 2 is a graph of isogain footprints without roll stabilization.

FIG. 2 shows an example of isogain line patterns for a radar installation where an antenna is mounted at 45 degrees from an aircraft fuselage (such as a wing installation). More particularly, FIG. 2 shows a graph of the ground plane projection deviation between isogain lines and ground radial lines where the ground mapping is performed without roll stabilization. The horizontal axis 100 of the graph represents the cross aircraft velocity vector 78 and corresponds to the Y*, axis 56 in FIG. 1. The vertical axis 102 of the graph represents the longitudinal aircraft velocity vector 77 and corresponds to the X*, axis 54 in FIG. 1. The outwardly radiating lines (collectively referred to as 104, individually referred to as 104a, 104b, 104c, 104d, 104e, 104f and 104g) in FIG. 2 are graphical representations of ground radial lines 72 in FIG. 1. Ground radial lines are shown for map angles of 0° 104a, 15° 104b, 30° 104c, 45° 104d, 60° 104e, 75° 104f and 90° 104g. The solid lines (collectively referred to as 106, individually referred to as 106a, 106b, 106c, 106d, 106e, 106f and 106g) in FIG. 2 are graphical representations of isogain lines. Isogain line 106b shown in FIG. 2 corresponds to the isogain line 89 in FIG. 1. While FIG. 1 shows only one isogain line 89, FIG. 2 shows the deviation between various isogain lines 106 and grounds radial lines 104. The plot is for an aircraft at an altitude of 10,000 feet banking at a 30 degree roll angle, with a 45 degree antenna boresight angle. $\phi_d$ 108 shows the angular deviation between a ground radial line 104b at 15° and a corresponding isogain line 106b.

In FIG. 2, very large angular deviations ($\phi_d$ 108, for example) between isogain lines 106 and ground radial lines 104 are observed, and these deviations grow larger at map angles closer to the longitudinal aircraft velocity vector 77. The large angular deviation produces rapid antenna gain falloff as a function of map range. This reduces the high-resolution map range coverage. When map range coverage falls below the desired extent, antenna beamwidth is forced to spread wider in azimuth in order to cover the desired map. This lowers antenna gain and degrades signal-to-noise performance of a resultant map. Larger azimuth beam spoiling (i.e., beamwidth widening) will also aggravate a doppler ambiguity problem associated with proper selection of Pulse Repetition Frequency (PRF). This doppler ambiguity problem is routinely encountered in high-resolution radar mapping.

Figure 3:
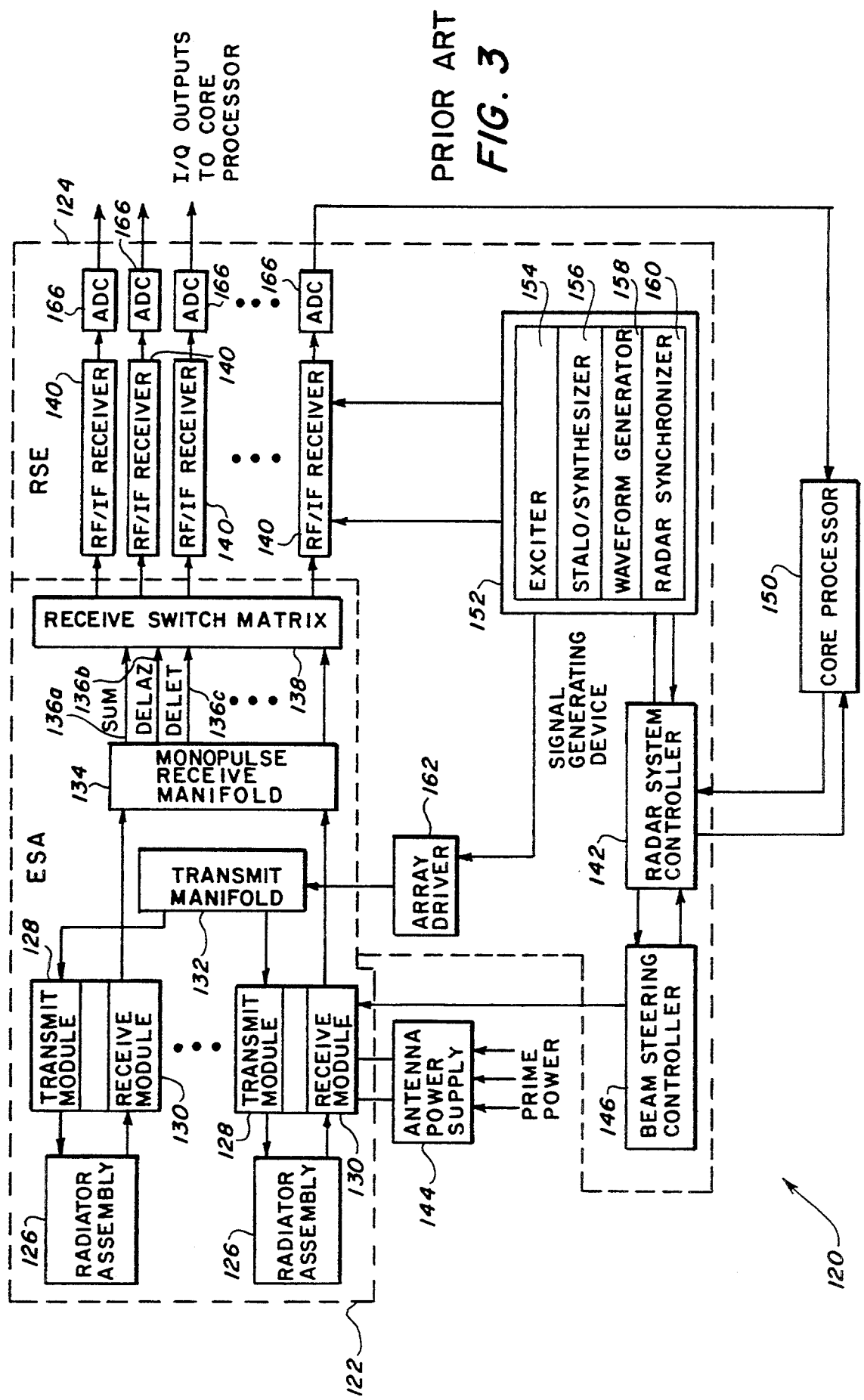
FIG. 3 is a block diagram of a typical radar system.

FIG. 3 shows a block diagram of a generic radar system 120 utilizing an electronically scanned phased array antenna. This radar block diagram configuration is one of many different block configurations available for radar design which are well known in the art and is shown here for purposes of illustration. The generic radar system 120 utilizes an Electronically Scanned Antenna (ESA) 122 and has various other associated components collectively designated as the Radar Support Electronics (RSE) 124. The Electronically Scanned Antenna 122 in FIG. 3 is a phased array.

The Electronically Scanned Antenna 122 contains numerous Radiator Assemblies 126. There can be hundreds of Radiator Assemblies 126 if it is required for a particular application. A Radiator Assembly 126 is designed to couple electromagnetic energy between free space and the Transmit Module 128 or Receive Module 130. The Radiator Assembly 126 is usually made out of some type of metal and can be in the form of many shapes.

The Radiator Assembly 126 is connected to a Transmit Module 128 and a Receive Module 130. The Transmit Module 128 amplifies the electromagnetic waves it receives from the Transmit Manifold 132 and sends them to the Radiator Assembly 126. The Transmit Module 128 includes a phase shifter (not illustrated) to steer the radar beam 50. The Receive Module 130 receives electromagnetic waves from the Radiator Assembly 126, amplifies this signal, and sends it to the Monopulse Receive Manifold 134. The Receive Module 130 also includes a phase shifter (not illustrated) to phase shift the received beam (not illustrated). The Transmit Module 128 and the Receive Module 130 are normally separate modules, however, they are sometimes grouped together as one unit which performs both functions. Since a Receive Module 130 is usually very sensitive to high power inputs, radar systems typically utilize a circulator (not illustrated) or duplexer (not illustrated) to protect the Receive Module 130 by disconnecting it from the Radiator Assembly 126 during the presence of a powerful transmitter pulse. Upon the termination of an output pulse the circulator or duplexer disconnects the Transmit Module 128 from the Radiator Assembly 126 and directs all the returning echo power into the Receive Module 130. There is usually one Transmit Module 128 and one Receive Module 130 for each Radiator Assembly 126.

The signal from the Receive Module 130 is fed into a Monopulse Receive Manifold 134 which gathers received signals from the Receive Modules 130 and forms various signals for output on signal channels 136a, 136b, 136c. These channels typically include a channel for the sum of the received signals, SUM 136a, a difference channel of the azimuth components of the received signals, DELAZ 136b, and a difference channel of the elevation components of the received signals, DELEL 136c, although other signal channels can be configured if required for a particular radar application. Each signal has its own channel 136a, 136b, 136c which feeds into the Receive Switch Matrix 138. The Receive Switch Matrix 138 is a switching network which switches the channels 136a, 136b, 136c to the RF/IF Receivers 140. The Receive Switch Matrix 138 enables a radar system to have various numbers and configurations of channels 136a, 136b, 136c and RF/IF Receivers 140. For example, a system could have three signals, SUM, DELAZ, DELEL and three RF/IF Receivers. Another system could have the same three channels, but only two RF/IF Receivers. A third system could have five different channels but only have two or three RF/IF Receivers. The Receive Switch Matrix 138 allows a radar system to chose which channels 136a, 136b, 136c to send through the RF/IF Receivers 140. The number of required channels depend on the particular radar application. The Receive Switch Matrix 138 is controlled by the Radar System Controller 142.

An Antenna Power Supply 144 is connected to the Electronically Scanned Antenna 122. The Antenna Power Supply 144 is mainly needed to supply power for the Transmit Modules 128. The Transmit Modules 128 will need significantly more power than the other components in the system. The Antenna Power Supply 144 acts as an AC to DC converter in converting the aircraft Prime Power, which is in AC form, into DC power.

The Electronically Scanned Antenna 122 is steered by a controller designated as the Beam Steering Controller (BSC) 146. The Beam Steering Controller 146 sends steering signals to the phase shifters in the Electronically Scanned Antenna 122 to control antenna steering. The Beam Steering Controller 146 is interfaced to another computer, the Radar System Controller (RSC) 142. The Radar System Controller 142 provides the Beam Steering Controller 146 with steering information such as the desired elevation angle, azimuth angle, beamshape and azimuth spoiling factor derived from aircraft sensor inputs (not illustrated) and pilot inputs (not illustrated). The Beam Steering Controller translates this information into commands necessary to control phase shifters (not illustrated) in the Electronically Scanned Antenna 122. The Radar System Controller 142 also controls the other radar system components and the radar system as a whole by making the entire system work together in time, space and frequency. The Radar System Controller 142 is interfaced to a Core Processor 150 which performs functions such as signal processing, data processing and tracking functions.

The Radar System Controller 142 is also interfaced to a Signal Generating Device 152 which provides desired waveforms for the radar transmitting and receiving functions. The Signal Generating Device 152 typically provides the functions of an Exciter 154, a Stable Local Oscillator (STALO)/Synthesizer 156, a Waveform Generator 158 and a Radar Synchronizer 160. However, depending on a particular radar application and the type of generated pulse that is desired, all these functions are not always required. Many radar systems utilize variations of these functions. The overall Signal Generating Device 152 in FIG. 3 is only meant to be an example of one possible Signal Generating Device 152 configuration.

The Stable Local Oscillator (STALO)/Synthesizer 156 is the source of generated waves. The Stable Local Oscillator portion of the Stable Local Oscillator (STALO)/Synthesizer 156 is used for analog wave generation while the Synthesizer portion of the Stable Local Oscillator (STALO)/Synthesizer 156 is used for digital wave generation. Either analog or digital or both methods of waveform generation can be used, depending on a particular radar application. The Exciter 154 amplifies the Stable Local Oscillator (STALO)/Synthesizer 156 signal and performs various frequency divider and frequency multiplier functions to modify the signal to the desired amplitude and frequency for radar transmission. A Waveform Generator 158 can be used to generate phase codes, such as Barker Codes. A Radar Synchronizer 160 can be used as a "gate" to control when to start and stop the signal.

The signal from the Signal Generating Device 152 is typically fed into an Array Driver 162 which takes the signal and amplifies it for input into the Transmit Manifold 132. The Transmit Manifold 132, which is usually a waveguide, then distributes the signal to the Transmit Modules 128. The signal from the Signal Generating Device 152 is also fed to RF/IF Receivers 140.

RF/IF Receivers 140 constitute one or more RF/IF receiver channels which receive RF signals from the Electronically Scanned Antenna 122 and convert the RF frequency signals to intermediate frequency (IF) signals. A typical RF/IF Receiver 140 performs the following functions: (1) frequency shifting the signal from RF to IF; (2) shifting the signal from IF to baseband (no modulation) by using the exciter signal to remove the transmit frequency; (3) filtering each step to maintain the signal within required bandwidths.

The output of the RF/IF Receivers 140 is fed to an Analog to Digital Converter (ADC) 166 for conversion to a digital format suitable for computer processing. The output of the Analog to Digital Converter 166, in I/Q (inphase/quadrature) form, is then fed to the Core Processor 150.

The present invention is an improvement to the performance of a radar system, such as the generic system in FIG. 3, so as to provide antenna axis roll stabilization and the associated spread beam control. The effect of the present invention is to provide much better illumination for high-resolution ground mapping.

To provide the proper roll stabilization, the antenna axis roll angle (ROLL) must be determined. Once ROLL is computed, the antenna axis is adjusted or "rolled," to implement the ROLL angle. The adjusted antenna axis can be referred to as the "rolled" antenna axis. This rolling of the antenna axis causes the radar beam 50 to shift along with the rolled antenna axis.

COMPUTING THE ANTENNA AXIS ROLL ANGLE

Let $L_1$ and $L_2$ be the line-of-sight vectors from an aircraft 52 to the maximum and minimum range reference points respectively along a ground radial line on the ground plane 70. The line-of-sight vectors are initially determined in a coordinate system based on the earth plane. Such coordinate systems are well-known in the art and commonly used in aircraft navigational systems. In FIG. 1, line 180 represents $L_1$, the line-of-sight vector for the maximum range reference point and line 182 represents $L_2$, the line-of-sight vector for the minimum range reference point. With batch Synthetic Aperture Radar (SAR) implementation, i.e., a well-known in the art mode of radar operation where one radar beam covers an entire map area, the line-of-sight vectors 182, 180 for the minimum and maximum range reference points are generated once during mode initialization and are used during the entire active data collection interval. For Doppler Beam Sharpening (DBS) and line-by-line SAR implementations, i.e., well-known modes of radar operation where the map is larger than the beamwidth, it is necessary to recalculate the line-of-sight vectors 182, 180 during the active scan. The line-of-sight vectors of Monopulse Ground Mapping (MGM) mode are also scanning the ground radial line 72. The line-of-sight vectors are provided by the motion compensation routines in the aircraft's navigational system computers (not illustrated).

Unit line-of-sight vectors ($UL_i$) are obtained from the line-of-sight vectors ($L_i$) 182, 180 by:

$$UL_i = L_i / |L_i|$$

$i = 1, 2$

The two unit line-of-sight vectors are transformed from the aircraft coordinate system to the antenna coordinate system by the following equations:

$$ULA_i = CTXNA * UL_i$$

$i = 1, 2$ where CTXNA is a coordinate transformation matrix from the aircraft coordinate system to the antenna coordinate system. The CTXNA matrix is provided by the motion compensation kernal function. Since only projections on the antenna face are required to derive the antenna roll angle, only the azimuth component (designated the "y" components) and the elevation components (designated the "z" components) of the ULA's need to be computed. They are shown below:

$$ULA_i(y) = C_{21}*UL_i(x) + C_{22}*UL_i(y) + C_{23}*UL_i(z)$$

$i = 1, 2$ $$ULA_i(z) = C_{31}*UL_i(x) + C_{32}*UL_i(y) + C_{33}*UL_i(z)$$

Figure 4:
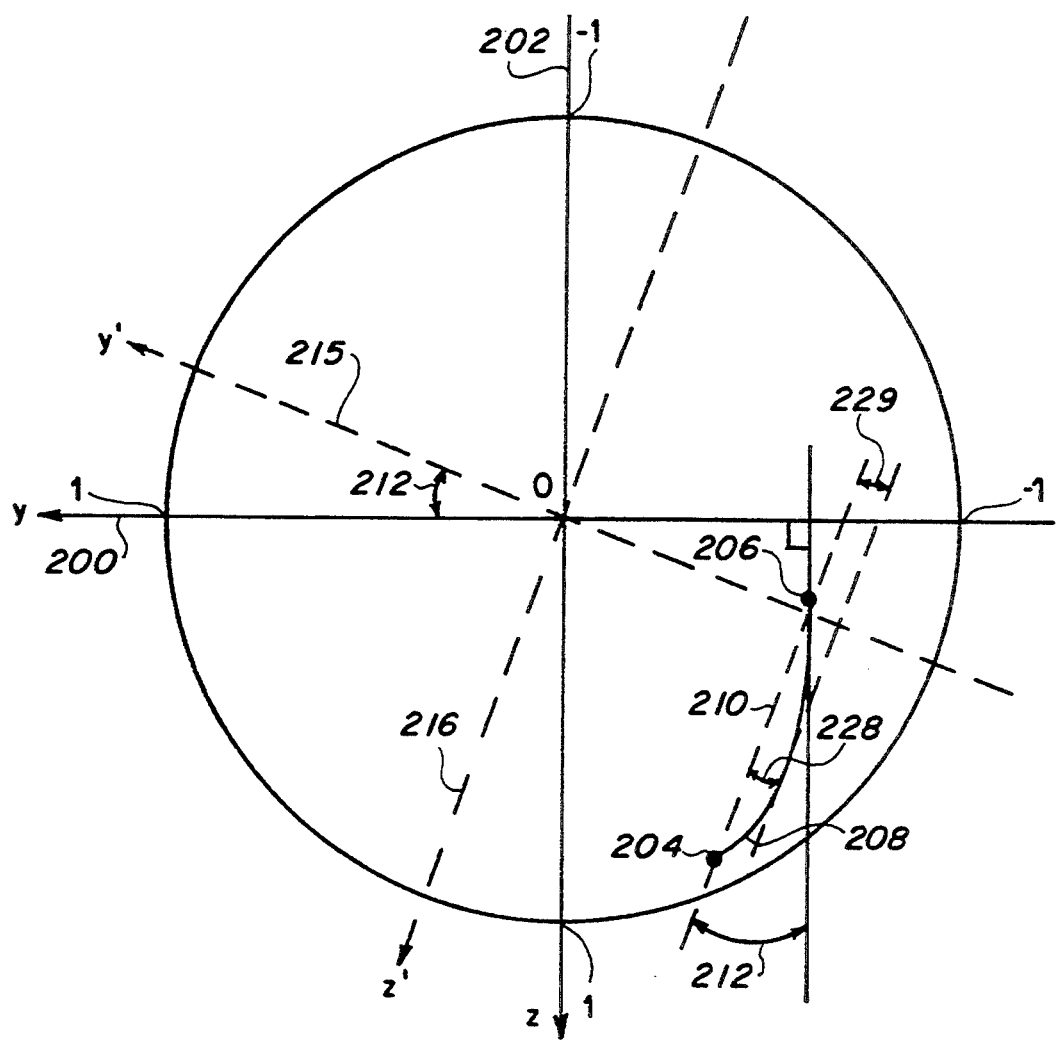
FIG. 4 is an antenna space graph of unit vectors along a ground radial line.

$i = 1, 2$ where $C_{ij}$ is the i-th row and j-th column element of the coordinate transformation matrix, CTXNA The unit vectors along a ground radial line for a specific map angle are shown in the antenna space plot of FIG. 4. The y axis 200 represents the sine of the antenna azimuth angle, that is, the angle on the antenna's azimuth axis (not illustrated) from the antenna center to the map point. The z axis 202 represents the sine of the antenna elevation angle, that is, the angle on the antenna's elevation axis (not illustrated) from the antenna center to the map point. In an antenna space graph such as FIG. 4, ground radial lines (208, for example) appear as curved lines while an isogain line (not illustrated in FIG. 4) would appear as a straight line parallel to the z axis 202. FIG. 4 shows representations of both the near range unit vector $ULA_1$ as a point 204 and the far range unit vector $ULA_2$ as a point 206 along a ground radial line (208 in FIG. 4). Any round radial line could be represented in a similar manner. A dashed connecting line 210 is made between the near range unit vector point 204 and far range unit vector point 206 which forms a line from which an antenna axis roll angle, $\phi_r$ 212, hereafter called "ROLL", from the z-axis 202 can be defined. The y' axis 215 represents the rolled antenna azimuth axis and the z' axis 216 represent the rolled antenna elevation axis. The y' axis 215 and z' axis 216 are defined by the antenna axis roll angle, $\phi_r$ 212, from the y axis 200 and z axis 202. The y' axis 215 and z' axis 216, taken together, represent the rolled antenna axes. ROLL 212 is calculated as follows:

$$y_r = ULA_2(y) - ULA_1(y)$$

$$z_r = ULA_2(z) - ULA_1(z)$$

$$\text{ROLL} = \text{Tan}^{-1}(y_r / z_r)$$

If ( $z_r \geq 0$) ROLL = −ROLL

If ( $y_r \geq 0$, $z_r < 0$) ROLL = −π−ROLL

If ( $y_r < 0$, $z_r < 0$) ROLL = π−ROLL

The range of ROLL 212 is from −π to handle the full 360° aircraft roll. Since the isogain line (not illustrated in FIG. 4) is a straight line parallel to the z axis 202 in the antenna direction-cosine space, ROLL 212 may be used as the required antenna axis roll angle for the doppler processed map modes, i.e., SAR and DBS. Although the adjusting or "rolling" of the antenna axes is an electrical roll (the antenna axes are not physically moved), this electrical roll of the antenna axes will result in a corresponding shift in the physical movement of the radar beam 50. In effect, the radar beam 50 is shifted to correspond to the rolled antenna axes.

Map points other than those corresponding to the near range unit vector point 204 and the far range unit vector point 206 may be used in the above computations. However, after analyzing simulation results, it was found that roll stabilization based on the near and far ranges (i.e., the maximum and minimum ranges) represents a near-optimum solution because of the highly nonlinear mapping results of the ground radial lines at near ranges.

In MGM mode, up to this point ROLL would be computed in the same manner as described above. Further processing is required, however, because monopulse processing principles restrict the antenna axis roll angle, ROLL 212, to multiples of $\pi/2$. Therefore, the antenna z-axis after roll stabilization must lie along one of the antenna monopulse axes. The additional processing required for the MGM mode is shown below:

If $(-\pi/4 \leq ROLL \leq \pi/4)$ ROLL=0,
MONOAX=1

If $(-3\pi/4 \leq ROLL < -\pi/4)$ ROLL=$-\pi/2$,
MONOAX=2

If $(\pi/4 < ROLL \leq 3\pi/4)$ ROLL=$\pi/2$,
MONOAX=2

If (ROLL<$-3\pi/4$ or ROLL>$3\pi/4$) ROLL=$\pi$,
MONOAX =1

The variable MONOAX determines which monopulse axis to use. If MONOAX =1, then select the azimuth monopulse axis for monopulse ground map processing; If MONOAX =2, then select the elevation monopulse axis for ground map processing.

The new coordinate transformation matrix from the aircraft coordinate system to the rolled antenna coordinates is derived as follows:

$$CTXNRA = CTXARA * CTXNA$$

where the transformation matrix from the antenna original axis to the rolled axis is given by $$CTXARA = \begin{vmatrix} 1 & 0 & 0 \\ 0 & \cos(ROLL) & \sin(ROLL) \\ 0 & -\sin(ROLL) & \cos(ROLL) \end{vmatrix}$$

The i-th row and j-th column element of the transformation matrix, CTXNRA, from the aircraft coordinate system to the rolled antenna coordinates will be denoted by $C_{ij}'$. The unit line-of-sight vector in the rolled antenna space is now represented by $ULRA_i$.

Figure 5:
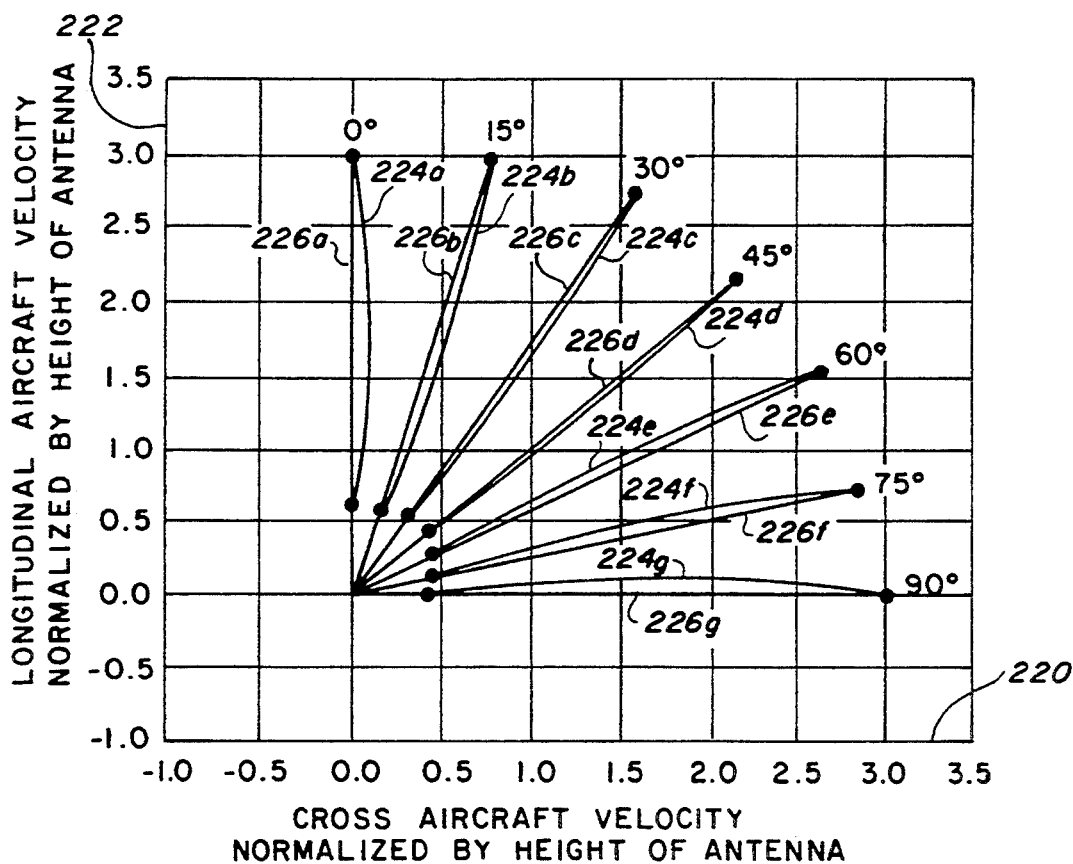
FIG. 5 is a graph of isogain footprints with roll stabilization.

FIG. 5 shows the isogain footprints after roll stabilization for the same example case as FIG. 2 (aircraft at an altitude of 10,000 feet banking at a 30 degree roll angle, with a 45 degree antenna boresight angle). As in FIG. 2, the horizontal axis 220 represents the cross aircraft velocity vector 78 and vertical axis 222 represents the longitudinal aircraft velocity vector 77. The isogain lines 224a, 224b, 224c, 224d, 224e, 224f, 224g after roll stabilization are shown to be much better aligned to the ground radial lines 226a, 226b, 226c, 22d, 226e, 226f, 226g.

AZIMUTH POINTING ANGLE

As can be seen in FIG. 4, there is a "misalignment" 228 between the ground radial line 208 and the new z-axis, z' 216, after antenna roll compensation which has to be taken into account in determining antenna azimuth pointing angle. The maximum misalignment is derived as follows. The y-coordinate of a map point in the rolled antenna space can be expressed as a function of the ground azimuth angle and ground elevation angles. By taking the derivative of y with respect to the ground elevation angle and setting it to zero, we obtain the elevation angle at which the y-coordinate has the most deviation from the z-axis. The corresponding maximum y-coordinate value is found via the following equations:

$$k_{1r} = C_{21}'* \cos(GDAZ) + C_{22}'* \sin(GDAZ)$$

$$k_{2r} = -C_{23}'$$

$$y_{max} = (k_{1r}^2 + k_{2r}^2)^{0.5}$$

where GDAZ is the ground azimuth angle of the ground radial line (i.e., the azimuth angle on the ground plane of the ground radial line). The maximum y-deviation, $y_{max}$ 229, between the isogain line (not illustrated in FIG. 4) and the ground radial line 208 after roll stabilization is then given by $$y_{max} = y_{max} - ULRA_1(y)$$

In the doppler processed map modes (SAR and DBS), the azimuth pointing angle is to be offset to center the antenna azimuth coverage over the ground radial line 208 after roll stabilization. The offset amount in the rolled antenna direction-cosine space is simply one half the maximum y-deviation. The resulting antenna azimuth pointing angle is therefore $$UPRA(y) = ULRA_1(y) + y_{max}/2$$

In MGM mode, where monopulse mapping is along the antenna isonull line, the above radar beam offset computations are not needed and the azimuth pointing angle UPRA(y) is simply ULRA $_1$(y).

Once the antenna azimuth pointing angle is calculated, the radar system must make the proper adjustments to implement the azimuth pointing angle. Typically, the new angle is fed into the Beam Steering Controller 146 to adjust the antenna beam 50 to the new antenna azimuth pointing angle. Various methods which a radar system uses to implement adjustments are well known in the art.

AZIMUTH BEAMSHAPE AND AZIMUTH BEAMWIDTH

The azimuth beamshape and azimuth beamwidth must be determined. Two azimuth beamshapes are used in the mapping modes: pencil beam (IAZBM=1) and fan beam (IAZBM=2). The radar beam selection logic and the required azimuth beamwidth depend on the antenna 3-dB beamwidths along the rolled antenna axes (BWYRA=3-dB beamwidth along the rolled antenna azimuth axis; BWZRA=3-dB beamwidth along the rolled antenna elevation axis) which are computed as follows:

$$BWYRA = |Cos^2(ROLL)/AZYA^2 + Sin^2(ROLL)/ELZA^2|^{-0.5}$$

$$BWZRA = |Sin^2(ROLL)/AZYA^2 + Cos^2(ROLL)/ELZA^2|^{-0.5}$$

where AZYA and ELZA are the 3-dB azimuth pencil beamwidth and elevation pencil beamwidth, respectively, in the original antenna direction-cosine space. BWZRA can be used by the radar system to select the proper elevation beamshape. The azimuth beamshape selection, IAZBM, and the computation of azimuth beamwidth, AZBWRA, for different mapping modes are shown in the following. For the MGM mode, the narrowest azimuth beamwidths are used. Therefore:

$$IAZBM = 1$$

$$AZBWRA = BWYRA$$

The line-by-line doppler processing modes will generally use azimuth fan beams. In these modes:

$$IAZBM = 2$$

$$AZBWRA = BWYRA + y_{max}$$

$$AZSPL = AZBWRA/BWYRA$$

where AZSPL is the required azimuth spoiling factor.

Figure 6:
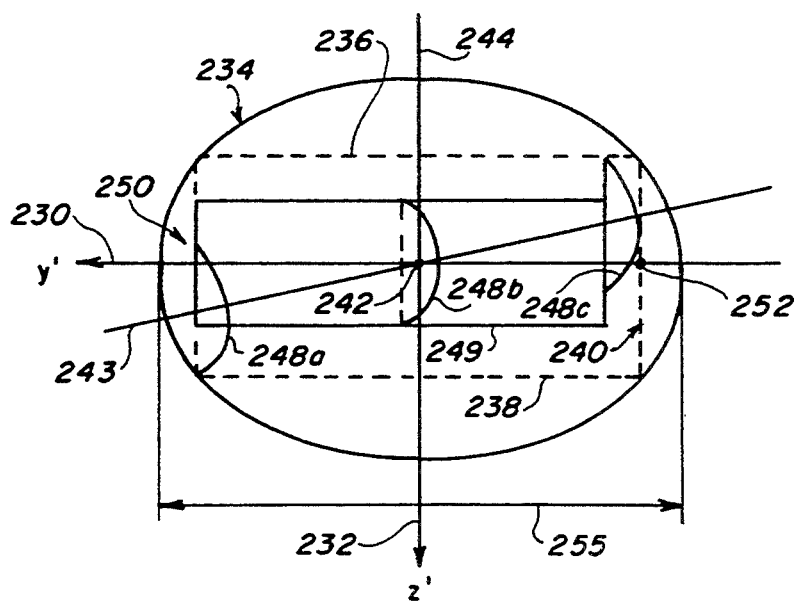
FIG. 6 is an antenna space graph of batch processed map geometry.

FIG. 6 is an antenna space plot which shows relevant geometric considerations for batch doppler processing modes. The plot in FIG. 6 is the same type of plot as in FIG. 4. The y' axis 230 and z' axis 232 correspond to the y' axis 215 and z' axis 216, respectively, in FIG. 4. The 3dB contour 234 is assumed to be an ellipse which encloses the rectangle 236 defined by the maximum y, y 238, and maximum z, z 240, extent of the map. The rectangle is centered on the antenna pointing angle axis center 242. The straight line 243 represents an antenna space tangent line of constant map elevation angle or constant range. The isogain line 244 overlaps the z' axis 232. The graph is centered on this isogain line 244. Curved lines (referenced collectively as 248, individually as 248a, 248b, 248c) represent ground radial lines. Ground radial line 248b represents the ground radial line of the map center. Prior to this invention, a typical radar might use a square map patch size equal to the inner rectangle 249. This inner rectangle 249, however, does not completely encompass the entire portion of each ground radial line (referenced collectively as 248, individually as 248a, 248b, 248c) in the map area. Some ground radial lines 248a, 248c are only partially encompassed by the inner rectangle 249. An advantage of this invention is to calculate the square map patch size, MAPSZ, to fully encompass all the ground radial lines 248 being mapped.

For the batch doppler processing modes (i.e., batch SAR), the ground azimuth coverage of the map swath (AZMWGR) is computed by the following equation:

$$AZMWGR = 2Tan^{-1}\{MAPSZ/[2 \cdot (L_2^2(x) + L_2^2(y))^{0.5}]\}$$

where MAPSZ is the square map patch size, i.e., the area of the rectangle 236. AZMWGR is multiplied by the derivative of the unit line-of-sight vector of the map center with respect to the ground azimuth angle to derive the delta change of the unit line-of-sight vector over the map azimuth width, DUL$_2$.

$$DUL_2(x) = -UL_2(y) \cdot AZMWGR$$

$$DUL_2(y) = UL_2(x) \cdot AZMWGR$$

$$DUL_2(z) = 0$$

This delta change vector is transformed from the aircraft coordinate system to rolled antenna space by (DULRA$_2$=Delta change vector in rolled antenna space):

$$DULRA_2(y) = C_{21}' \cdot DUL_2(x) + C_{22}' \cdot DUL_2(y)$$

$$DULRA_2(z) = C_{31}' \cdot DUL_2(x) + C_{32}' \cdot DUL_2(y)$$

Only the y (azimuth) and z (elevation) components are relevant to antenna beamshape selection. The y-component of the delta change vector is combined with the maximum y-deviation, y$_{max}$ 229, between the isogain and the ground radial lines to get the total y-axis coverage requirement (TULRA$_2$):

$$TULRA_2(y) = DULRA_2(y) + y_{max}$$

The total z-axis coverage requirement, TULRA$_2$(z), is 15 obtained by combining the z-component of the delta change vector with z$_{rg}$ defined by the map range coverage:

$$z_{rg} = |ULRA_1(z) - ULRA_2(z)|$$

$$TULRA_2(z) = DULRA(z) + z_{rg}$$

To provide adequate azimuth coverage over the entire map patch, the required azimuth beamwidth is found to be:

$$AZBWRA = TULRA_2(z)/2 + [TULRA_2(y)^2 + TULRA_2(z)^2/4]^{0.5}$$

The rectangle 236 is centered on the antenna pointing angle axis center 242 and its extents, y 238 and z 240, take into account the map patch size, the misalignment (228 in FIG. 4) between the isogain lines and ground radial lines, and the angular deviation between the ground azimuth direction and the y-axis of the rolled antenna space. The elliptical pattern solution is not unique; the pattern with the y-axis as the major axis and the distance between two foci 250, 252 equal to y 238 was selected. The required azimuth beamwidth 255 is the distance between the two y-axis intercepts of the antenna pattern (3dB contour 234).

The resulting azimuth beamwidth requirement is used in the following to determine the azimuth beamshape and beamwidth:

If $(AZBWRA \leq BWYRA)$ $IAZBM = 1$ $AZBWRA = BWYRA$

If $(AZBWRA > BWYRA)$ $IAZBM = 2$ $AZSPL = AZBWRA/BWYRA$

Once the azimuth beamshape, azimuth beamwidth and spoiling factors are calculated, the radar system must make the proper adjustments to implement these numbers. Such implementation usually requires that the numbers are fed to the Beam Steering Controller 46 to adjust the radar beam

IMPLEMENTATION CONSIDERATIONS

The azimuth pointing angle determination should be performed on a "look-to-look" basis in order to follow the instantaneous aircraft motion with minimal delay. "Look-to-look" is defined as the time between communications with the antenna controller. This time is a physical constraint of the communication architecture and represents the fastest time that a pointing angle can be updated. An antenna axis roll angle does not have to be updated at the same times as a antenna pointing angle. Antenna axis roll angle updates (i.e., implementation of the antenna axis roll angle) can be longer than antenna axis roll angle determinations. The rate at which an antenna axis roll angle is updated is a tradeoff between the processing throughput requirement and the radar system capability in following aircraft roll motion. For best results, the time between updates must be short enough so that the maximum aircraft roll angle change between updates is limited to 15° or less. The azimuth beamshape and azimuth beamwidth computations can also be done at the same rate as the dynamic antenna axis roll angle calculations.

Even after antenna axis roll angle, azimuth pointing angle, azimuth beamwidth and azimuth beamshape updates, there will still be some misalignment between isogain lines and ground radial lines. Sensitivity Time Control (STC) gain compensation can be performed to minimize this misalignment. STC consists of a software correction of the radar data before the data is converted to TV display format. The STC gain compensation function will need to be recomputed at the same update rate as the antenna axis roll angle updates to compensate for the antenna gain variation along the ground radial lines following each change of the antenna axis roll angle. Various forms of STC are well-known in the art.

The antenna pointing control should be performed in the Beam Steering Controller 46 to effect a minimum time delay in compensating for aircraft motion. Other beam control functions of this invention can be performed in either the Core Processor 50 or Beam Steering Controller 46 depending on a tradeoff of the processor loading and the data transfer requirements between the two processors.

It is understood that the above-described embodiment is merely illustrative of the possible specific embodiments which may represent principles of the present invention. Other arrangements may readily be devised in accordance with these principles by those skilled in the art without departing from the scope of the invention.

What is claimed is:

1. A radar system comprising:
    an antenna, said antenna producing a radar beam intersecting a ground plane to form an isogain line on said ground plane, said ground plane including a plurality of ground radial lines radiating from an origin point on said ground plane, said origin point being related to a navigational position of said radar system with respect to said ground plane, said isogain line having a corresponding ground radial line; and
    beam steering means for controlling said antenna and for adjusting said radar beam to closely align said isogain line with said corresponding ground radial line to facilitate scan conversion to a television display format.

2. A radar system as in claim 1, wherein said antenna is an electronically scanned antenna.

3. A radar system as in claim 1, wherein said antenna is an electronically scanned phased array antenna.

4. A method of controlling an antenna of a radar system having both an azimuth axis and elevation axis wherein said antenna produces a radar beam intersecting a ground plane to form an isogain line on said ground plane, said ground plane including a plurality of ground radial lines radiating from an origin point on said ground plane, said origin point being related to a navigational position of said radar system with respect to said ground plane, said isogain line having a corresponding ground radial line, wherein said method comprises the step of steering said radar beam by rotating the antenna azimuth and elevation axes to closely align said isogain line with said corresponding ground radial line to facilitate scan conversion to a television display format.

5. The method as in claim 4, further comprising the step of electronically scanning said antenna.

6. The method as in claim 4, wherein said antenna is a phased array, further comprising the step of electronically scanning said antenna.

7. The method as in claim 4, wherein said antenna has an antenna axis, further comprising the step of performing roll stabilization by computing an antenna axis roll angle and rolling said antenna axis by said antenna axis roll angle.

8. The method as in claim 7 further comprising:
    (a) computing an azimuth pointing angle for said radar beam;
    (b) controlling said antenna to implement said azimuth pointing angle.

9. The method as in claim 8 further comprising:
    (a) computing an azimuth beamshape for said radar beam;
    (b) controlling said antenna to implement said azimuth beamshape.

10. The method as in claim 9 further comprising:
    (a) computing an azimuth beamwidth for said radar beam;
    (b) controlling said antenna to implement said azimuth beamwidth.

11. The method as in claim 10 further comprising:
    (a) computing an azimuth spoiling factor for said radar beam; and
    (b) controlling said antenna to implement said azimuth spoiling factor.

12. The method as in claim 7, wherein said antenna has an azimuth axis and an elevation axis, wherein for a ground radial line being mapped, said ground radial line having a corresponding near range unit vector point and a corresponding far range unit vector point in antenna space, said step of roll stabilization further comprising calculating said antenna axis roll angle by making a straight connecting line to connect said near range unit vector point and said far range unit vector point, said connecting line forming said antenna axis roll angel with said elevation axis.

13. The method as in claim 8 wherein said step of computing said azimuth pointing angle comprises setting said azimuth pointing angle to center azimuth coverage over said corresponding ground radial line.

14. The method as in claim 13, wherein said isogain line and its corresponding ground radial line has a maximum azimuth deviation in rolled antenna space, and wherein a near range unit vector corresponds to said corresponding ground radial line, said step of setting said azimuth pointing angle further comprises the steps of:
- (a) transforming said near range unit vector into rolled antenna space to form a unit line-of-sight vector in the rolled antenna space, said unit line-of-sight vector in the rolled antenna space having an azimuth coordinate; and
- (b) setting said azimuth pointing angle equal to said coordinate plus one-half of said maximum azimuth deviation.

15. The method as in claim 14 further comprising the step of using a doppler beam sharpening or synthetic aperture radar map mode for radar operation.

16. The method as in claim 9 wherein, after said step of roll stabilization, said antenna has a rolled antenna azimuth axis and a rolled antenna elevation axis, said step of computing said azimuth beamshape further comprises computing said azimuth beamshape as a function of the 3 dB beamwidth along said rolled antenna azimuth axis and the 3 dB beamwidth along said rolled antenna elevation axis.

17. The method as in claim 4, said isogain line and corresponding ground radial line having a maximum azimuth deviation, said antenna having an antenna axis, further comprising the steps of:
- (a) selecting a line-by line doppler beam sharpening map processed mode for radar operation;
- (b) selecting fan beams for the type of radar beam;
- (c) performing roll stabilization by computing an antenna axis roll angle and rolling said antenna axis by said antenna axis roll angle, wherein after roll stabilization said atenna having a rolled antenna azimuth axis;
- (d) setting an azimuth beamwidth equal to the 3 dB beamwidth along said rolled antenna azimuth axis plus said maximum azimuth deviation in rolled antenna space; and
- (e) setting an azimuth spoiling factor equal to said azimuth beamwidth divided by the 3 dB beamwidth along said rolled antenna azimuth axis.

18. The method as in claim 4 further comprising the steps of:
- (a) performing roll stabilization by computing an antenna axis roll angle and rolling said antenna azimuth and elevation axis by said antenna axis roll angle, said antenna having a rolled antenna azimuth axis after roll stabilization;
- (b) selecting a synthetic aperture radar mapping mode for operation of said radar system, wherein said radar beam intersects said ground plane forming a map area having a total azimuth axis coverage and a total elevation axis coverage;
- (c) computing an azimuth beamwidth as a function of said total azimuth axis coverage and said total elevation axis coverage;
- (d) comparing the 3 dB beamwidth along said rolled antenna azimuth axis to said computed azimuth beamwidth;
- (e) selecting pencil beam and setting said an azimuth beamwidth equal to the 3 dB beamwidth along said rolled antenna azimuth axis when the 3 dB beamwidth along said rolled antenna azimuth axis is greater than or equal to said computed azimuth beamwidth; and
- (f) selecting a fan beam and setting an azimuth spoiling factor equal to said azimuth beamwidth divided by the 3 dB beamwidth along said rolled antenna azimuth axis when the 3 dB beamwidth along said rolled antenna azimuth axis is less than said computed azimuth beamwidth.

19. A radar system operating in monopulse ground mapping mode comprising:
an antenna, said antenna producing at least one radar beam, each such radar beam intersecting a ground plane to form an isonull line on said ground plane, said ground plane including a plurality of ground radial lines radiating from an origin point on said ground plane, said origin point being related to a navigational position of said radar system with respect to said ground plane, said isonull line having a corresponding ground radial line; and
beam steering means for controlling said antenna and for adjusting said radar beam to closely align said isonull line with said corresponding ground radial line to facilitate scan conversion to a television display format.

20. A radar system as in claim 19, wherein said antenna is an electronically scanned antenna.

21. A radar system as in claim 19, wherein said antenna is an electronically scanned phased array antenna.

22. A method of controlling an antenna of an radar system operating in monopulse ground mapping mode wherein said antenna produces at least one radar beam, each such radar beam having an azimuth and elevation beamshape, each such radar beam intersecting a ground plane to form an isonull line on said ground plane, said ground plane including a plurality of ground radial lines radiating from an origin point on said ground plane, said origin point being related to a navigational position of said radar system with respect to said ground plane, said isonull line having a corresponding ground radial line, wherein said method comprises the step of steering said radar beam to closely align said isonull line with said corresponding ground radial line to facilitate scan conversion to a television display format.

23. The method as in claim 22, further comprising the step of electronically scanning said antenna.

24. The method as in claim 22, wherein said antenna is a phased array, further comprising the step of electronically scanning said antenna.

25. The method as in claim 22, wherein said antenna includes an antenna axis, further comprising the step of performing roll stabilization by computing an antenna axis roll angle and rolling said antenna axis by said antenna axis roll angle.

26. The method as in claim 25 further comprising the steps of:
- (a) computing an azimuth pointing angle for said radar beam; and
- (b) controlling said antenna to implement said azimuth pointing angle.

27. The method as in claim 25, said antenna having an azimuth monopulse axis and an elevation monopulse axis, wherein for a ground radial line having a corresponding near range unit vector point and a corresponding far range unit vector point in antenna space, said step of performing roll stabilization further comprises computing said antenna axis roll angle by making a straight connecting line to connect said near range unit vector point and said far range unit vector point, said connecting line forming said antenna axis roll angle with said elevation monopulse axis.

28. The method as in claim 25, said antenna having an azimuth monopulse axis and an elevation monopulse axis, further comprising the steps of:
   (a) selecting said azimuth monopulse axis for monopulse ground map processing and setting said antenna axis roll angle equal to zero when said computed antenna axis roll angle is equal to or between $-\pi/4$ and $\pi/4$;
   (b) selecting said elevation monopulse axis for monopulse ground map processing and setting sad antenna axis roll angle equal to $-\pi/2$ when the antenna axis roll angle is between $-3\pi/4$ and $-\pi/4$ or equal to $-3\pi/4$;
   (c) selecting said elevation monopulse axis for monopulse ground map processing and setting said antenna axis roll angle equal to $\pi/2$ when the antenna axis roll angle is between $\pi/4$ and $3\pi/4$ or equal to $3\pi/4$; and
   (d) selecting said azimuth monopulse axis for monopulse ground map processing and setting said antenna axis roll angle equal to $\pi$ when the antenna axis roll angle is less than $-3\pi/4$ or greater than $3\pi/4$.

29. The method as in claim 26, wherein said isonull line and corresponding ground radial line have a maximum azimuth deviation, and a near range unit vector corresponds to said ground radial line, said step of computing said azimuth pointing angle further comprises the steps of:
   (a) transforming said near range unit vector into rolled antenna space to form a unit line-of-sight vector in the rolled antenna space, said unit line-of-sight vector in the rolled antenna space having an azimuth coordinate; and
   (b) setting said azimuth pointing angle equal to said azimuth coordinate.

30. The method as in claim 26 wherein the azimuth beamshape is selected to be pencil beam.

* * * * *